Dec. 31, 1957  C. R. COWLEY  2,817,927
PROCESS FOR MAKING STEMS
Filed March 16, 1956  3 Sheets-Sheet 1

INVENTOR
CLAYTON R. COWLEY
BY *Michael Hertz,*
ATTORNEY

Dec. 31, 1957  C. R. COWLEY  2,817,927
PROCESS FOR MAKING STEMS
Filed March 16, 1956  3 Sheets-Sheet 2

INVENTOR
CLAYTON R. COWLEY
BY Michael Hertz
ATTORNEY

Dec. 31, 1957  C. R. COWLEY  2,817,927
PROCESS FOR MAKING STEMS
Filed March 16, 1956  3 Sheets-Sheet 3

METHOD SHOWING
THREE GLASS FEEDS
ATTACHED TO STEM MACHINE

INVENTOR
CLAYTON R. COWLEY
BY *Michael Hertz,*
ATTORNEY

United States Patent Office 2,817,927
Patented Dec. 31, 1957

2,817,927

PROCESS FOR MAKING STEMS

Clayton R. Cowley, Emporium, Pa., assignor to Sylvania Electric Products, Inc., a corporation of Massachusetts Application March 16, 1956, Serial No. 572,129

6 Claims. (Cl. 49—78)

This invention relates to processes for making stems such as those which are designed to become the bases of electron tubes.

In the prior art, wafer stems were made by cutting off a series of collets or collars from a long tubular glass cane, then feeding a collet to a mold in which is temporarily retained a circular array of upstanding Dumet leads, with the collet surrounding lower portions of the leads, then fusing the glass collet by gas burners with flames playing on the collet while the mold is rotated, so that the glass will flow around the Dumet leads, and then pressing the fused glass against the mold and about the leads to form the stem.

These collets are of fairly thick glass and of low height. Obviously, variations in height of the glass collets resulted in very different thicknesses of final pressed stems, resulting in non-uniform strain patterns in the glass. Heating to fusion of the glass while the leads extended above the collet resulted in the leads being openly exposed to the gas burners and their being heated to high temperatures with consequent undesired burning of the leads and such undue degree of oxidation as to prevent proper seal between glass and lead, thereby promoting air leaks between leads and glass. Also such heating of the collets caused oxidation of the surface of the mold with decrease of life of the mold and roughening of its surface to such a degree as to effect the smoothness of the under surface of the formed stem with consequent improper strain pattern in the glass.

Among the objects of this invention are to provide methods to overcome the above objections.

In the process of electron tube manufacture, a tubulation integral with the electron tube envelope is held in a suction port and it acts as a conduit for the gas being evacuated from the electron tube. Toward the end of the evacuating process, the tubulation is softened at a point close to the electron tube envelope and while so softened the tubulation is drawn away from the envelope and perhaps slightly twisted to seal off the envelope and, incidentally, the softened end of the tubulation. The so drawn off tubulation is considered as a waste product.

A further object of the invention is to provide a method for producing electron tube stems utilizing this normally waste glass exhaust tubulation.

A still further object of the invention is to provide a method of stem manufacture which requires a fewer number of operations than is now necessary to obtain a finished stem and therefore requires simpler machinery with consequent saving in cost, utilization of less floor space and increase in production.

These and other objects will become apparent after consideration of the following specification and claims when taken in conjunction with the accompanying drawing in which:

In general, the process involves the use of waste pieces of slender glass tubulation and formation thereof into a gob of glass, depositing the gob in the center of a mold having a removable circular array of lead in conductors extending therefrom, and pressing the gob of glass to form a wafer with the lead in conductors embedded in the glass. The waste pieces of glass are of substantially the same length and slender so that small variation in length results in very little difference in weight of glass.

Figure 1:
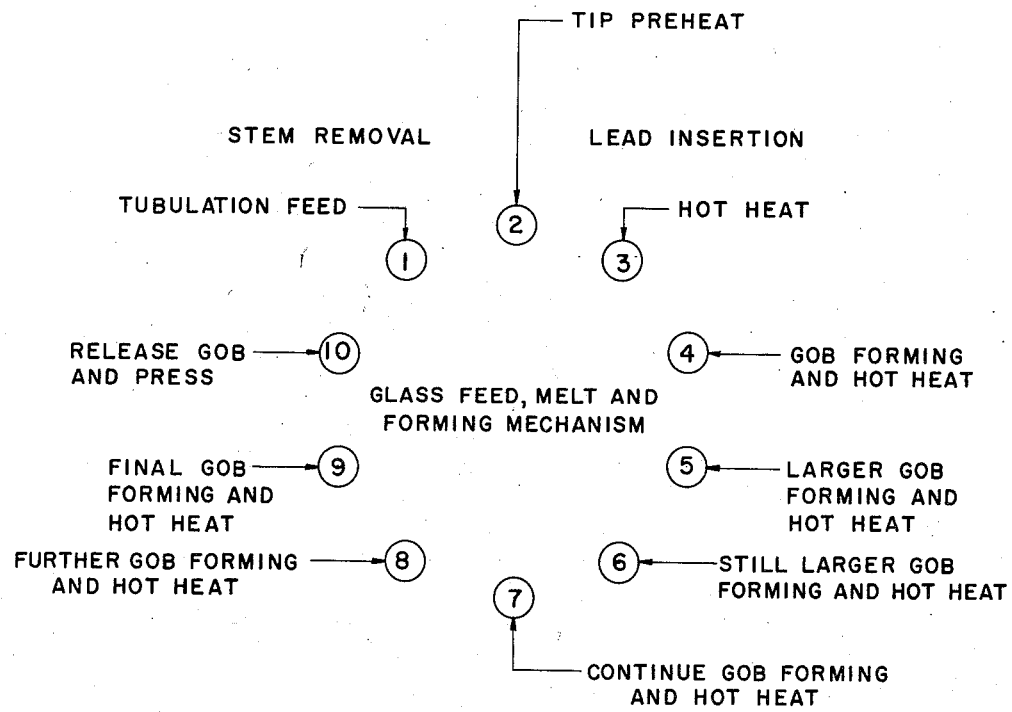
Fig. 1 is a diagram showing the general layout of a machine to carry out the process.
Figure 8:
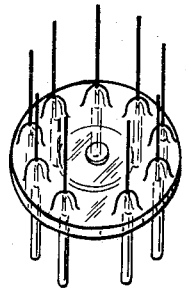
Fig. 8 shows a completed stem.

In carrying out the process, an indexible turret type machine may be employed. However, with this invention much fewer working stations than normally employed are requisite to convert the glass tubulation into the pressed stem. For example, a turret may be employed with only ten stations, as indicated in Fig. 1. At station 1 exhaust tubulations are fed to a chuck. At subsequent stations, for example, stations 2 to 9, the tubulation is converted into a gob of glass. At station 10 the gob of glass is pressed and molded about the lead in conductors. The molded stem may then be removed from the mold at an early one of the other stations whereat the tubulation is being transformed into a glass gob. At one of these early stations the mold is loaded with lead in conductors.

Figure 2:
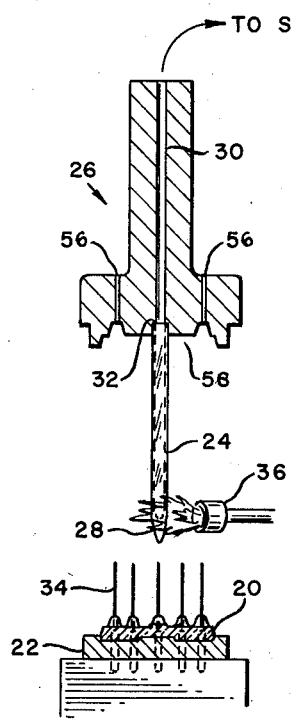
Fig. 2 depicts the parted exhaust tubulation inserted in a chuck of a machine and subjected to a tip pre-heating action.

In Fig. 2 there is shown the relative position of parts at an early stage in the formation of the gob of glass, for example at station 2. For the purposes of illustration, a previously formed stem 20 is shown in position on a mold 22 ready to be removed by any convenient mechanism or manually. It should be understood that this stem might have been removed at station 1 or may be removed at some station subsequent to station 2. At station 1 the parted section 24 of an exhaust tube is inserted in a chuck 26 above the mold, the tubulation being held therein by suction, as illustrated, or by spring pressed detents, or otherwise. The use of suction to hold the tubulation in the chuck is possible because the lower end thereof had been sealed in the tipping off process previously described. The chuck, where suction is utilized as the medium for holding the tubulation to the chuck, is provided with a central bore 30, slightly enlarged at its lower end to provide a seat 32 against which the upper end of the tubulation will bear when suction is applied to the chuck.

After the stem 20 is removed from the mold and at any station prior to the positioning of the glass gob onto the mold, the mold may be loaded with lead in conductors 34.

Figure 3:
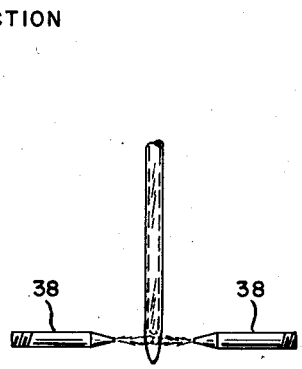
Fig. 3 shows the same tubulation tip subjected to hot fires.

At station 2 the tipped end 28 of the tubulation may be subjected to a spread out preheating flame as from a burner 36. At station 3, see Fig. 3, the free end of the tubulation is subjected to a hot sharp fire or fires as those issuing from nozzles 38.

Figure 4:
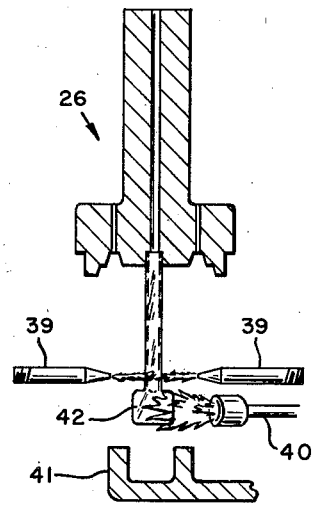
Fig. 4 shows the initial formation of a glass gob on the softened end of the exhaust tubulation.

At the fourth station the glass approximate the end is further heated by pin point fires as by nozzles 39 while the nearer end portion is heated by less intense fires issuing from nozzle 40. At this station the tip of the tubulation is puddled into a ball by moving a cup or ladle 141 upwardly against the lower end of the tubulation. This cup may be operated by any suitable means in timed relation with the motion of the turret so that it will move up and drop away again immediately after stoppage of turret indexing movement, in the meantime puddling the glass into the ball shape shown at 42 in Fig. 4.

At station 5 substantially the same action takes place, the area above the glass gob having been previously softened at station 4 by the pin point flames issuing from nozzles 39 to an extent sufficient to permit further puddling of the glass.

Figure 5:
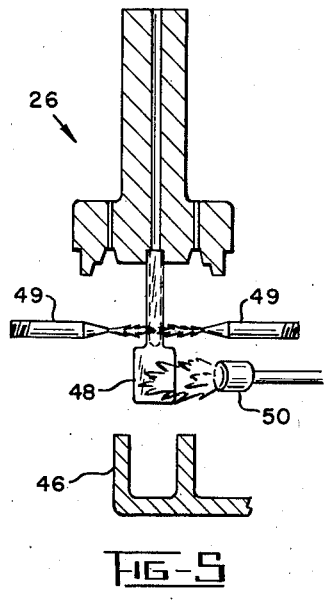
Fig. 5 shows the formation of the glass gob in a further stage in the transformation of the exhaust tubulation.
Figure 6:
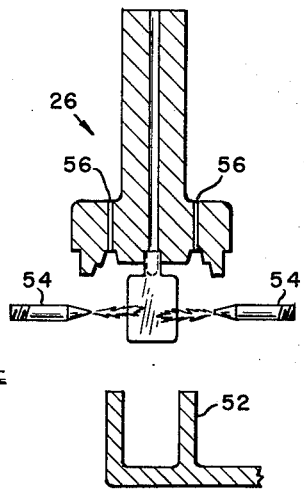
Fig. 6 shows the formation of the glass in a final stage of transformation of the exhaust tube into a glass gob.
Figure 7:
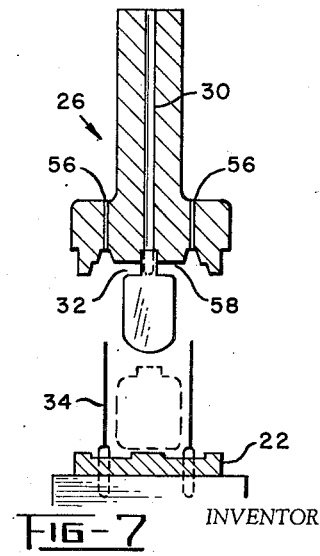
Fig. 7 shows the gob of glass ready to be brought down onto the mold and between leads previously positioned in the mold, for subsequent pressing by the chuck, the gob being shown in dotted lines in an intermediate position.

At stations 6 and 7 further puddling by cups 46 and formation of larger gobs 48 take place, the tubulation itself, of course, becoming shorter as illustrated, for example, in Fig. 5. In the meantime pin point fires issuing from nozzles 49 soften the tubulation sufficiently to permit further puddling of the glass while less intense fires issuing from nozzle 50 maintain the gob 48 plastic. This puddling and gob forming action on the glass takes place at stations 8 and 9 also. At station 9, see Fig. 6, practically all of the tubulation has been converted into a solid glass plastic cylinder by the action of cup 52 so that when the turret reaches station 10 and the chuck 24 is no longer subjected to suction, the glass gob previously heated at station 9 by nozzles 54 is dropped onto the mold in a molten condition as seen in Fig. 7 ready for being pressed to shape about the lead in conductors. It is contemplated as an alternative method, that the chuck may carry the gob onto the mold and release the gob after deposit of the gob on the mold.

The chuck itself may be the upper part of the mold, the same being provided with bores 56 to slide over the leads as the mold elements approach each other and the bottom of the chuck being contoured as at 58 to provide the proper upper surface on the stem. The chuck, when it reaches station 10, is very hot due to the proximity of the flames when the chuck was at the late stations and due to heat conduction, and the remnant of tubulation that was held in the chuck is sufficiently plastic to be workable when the gob of molten glass is on the lower mold. It should be noted that since, in the formation of the stem, no hot pin point flames were ever directed at the stem leads, loss of such leads due to undesired heating thereof is avoided. Also it should be noted that the conventional stem forming machine utilizes some thirty stations necessitating the use of a greater amount of floor space than is requisite where only ten stations are employed, as in the disclosed process.

It is possible in carrying out the disclosed process to employ a thirty position machine. In that case the machine has three times the production of a conventional thirty head machine since the heads of the machine are divided up into three groups of stem forming mechanisms each comprising ten stations.

It is also possible to adapt a conventional thirty head machine to receive molten gobs of glass and still have a production three times that of the conventional thirty head machine since the heads of the machine would then be divided up into three groups of stem forming mechanisms each comprising ten stations.

Figure 9:
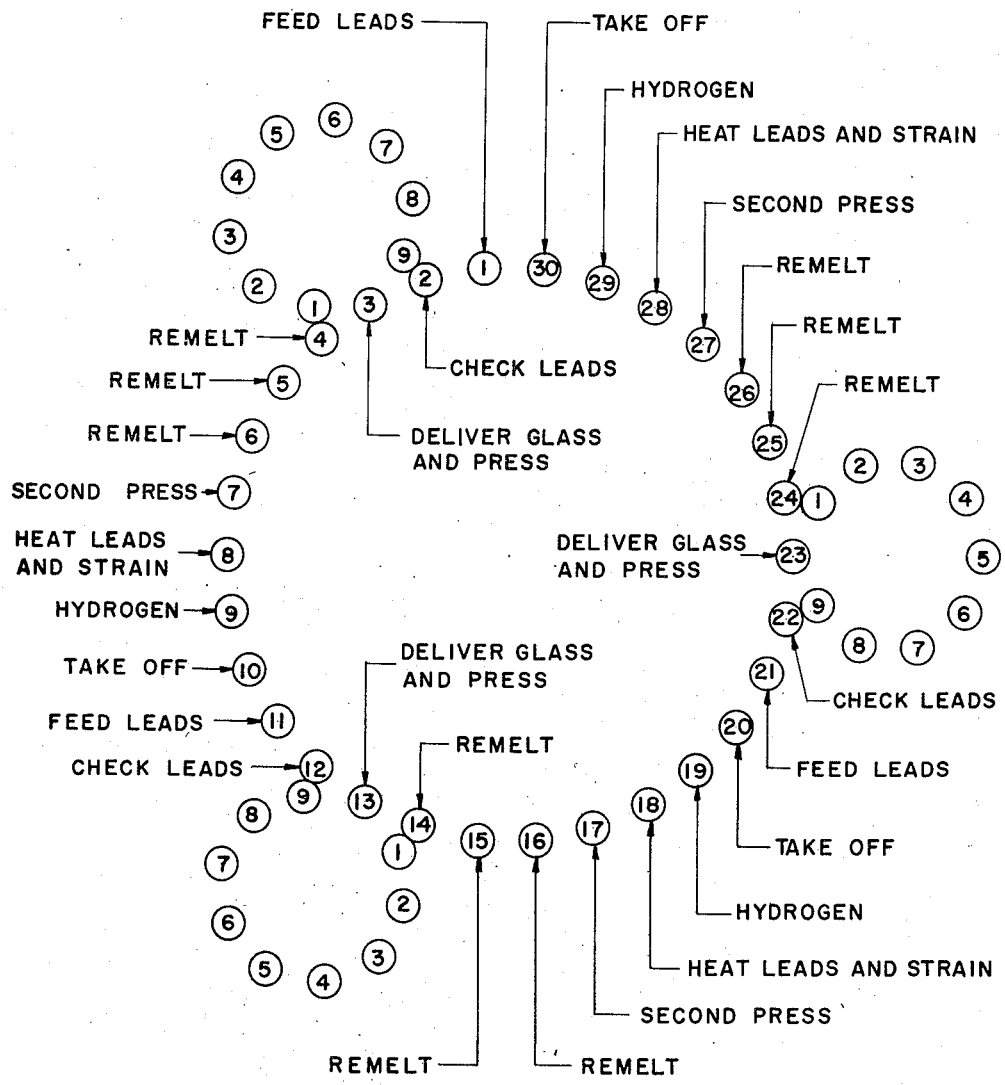
Fig. 9 is a diagram of a modified machine layout.

It is also possible to adapt a conventional thirty head machine to receive molten gobs of glass and still have a production three times that of the conventional machine by adopting the method disclosed in Fig. 9. The thirty head machine has associated with it three glass gob manufacturing machines such as carry out the method previously disclosed. The tenth stations of each of these gob manufacturing machines are made coincident with the third, thirteenth and twenty-third stations, respectively, of the thirty head machine so that the glass gobs can be dropped onto the molds of the thirty head machine. At the first, eleventh and twenty-first stations the lead in conductors are fed to the bottom mold in a manner well known in the art. The conductors are checked to determine whether the molds are properly filled at the second, twelfth and twenty-second stations, then, as will be clear by inspection of Fig. 9, the glass gobs are delivered to the bottom molds and given an initial press; next the partly formed stems are subjected to heating flames at the following two stations and finally pressed at the next station of each group. At the subsequent station of each group the leads and glass are properly cooled to remove glass strain. At the ninth, nineteenth and twenty-ninth stations the leads are properly subjected to a reducing gas to remove undesired oxides and finally the molds are unloaded at the tenth, twentieth and thirtieth stations.

None of the mechanism of the thirty head machine is shown since this mechanism is old in the art and no claim is made to this specific mechanism.

What is regarded as new and what is claimed is:

1. In the process of producing glass stems, the steps of supplying a glass tubulation to a combined mold and chuck with the tubulation held by the chuck at one end only, heating the free end of the tubulation to soften the same, and thrusting the free end of the softened glass toward the chuck to shorten the length of the tubulation while enlarging the diameter of the softened glass to thereby produce a gob of glass.

2. The process of producing glass stems, comprising feeding lead in conductors to a mold, supplying a glass tubulation to said mold and an associated chuck with the tubulation held by the chuck at one end only, heating the free end of the tubulation to soften the same, thrusting the free end of the softened glass toward the chuck to shorten the length of the tubulation while enlarging the diameter of the softened glass to thereby produce a gob of glass, delivering the gob of glass to the mold, and pressing the gob against the mold and about the conductors to form a stem.

3. The process of producing glass stems comprising, feeding lead in conductors to a bottom mold, supplying a glass tubulation to said mold and an associated chuck with the tubulation vertical and held by the chuck at its upper end only, heating the lower end of the tubulation to soften the same, thrusting the lower end of the softened glass upwardly to shorten the length of tubulation while enlarging the diameter of the softened glass, repeating the heating and thrusting process until substantially none of the tubulation remains, thereby producing a gob of glass, delivering the gob of glass to the mold, and pressing the gob against the mold and about the conductors to form a stem.

4. In the process of producing glass stems the steps of supplying a glass tubulation to a combined mold and chuck with the tubulation vertical and held by the chuck at its upper end only, heating the lower end of the tubulation to soften the same, thrusting the lower end of the softened glass upwardly to shorten the length of tubulation while enlarging the diameter of the softened glass, and repeating the heating and thrusting process until substantially none of the tubulation remains, thereby producing a gob of glass.

5. In the process of producing glass stems, the steps of supplying a glass tubulation to a combined mold and chuck with the tubulation held by the chuck at one end only, heating the free end of the tubulation to soften the same, thrusting the free end of the softened glass toward the chuck to shorten the length of tubulation while enlarging the diameter of the softened glass, and repeating the heating and thrusting process until substantially none of the tubulation remains, thereby producing a gob of glass.

6. The process of producing glass stems comprising, feeding lead in conductors to a mold, supplying a glass tubulation to said mold and an associated chuck with the tubulation held by the chuck at one end only, heating the free end of the tubulation to soften the same, thrusting the free end of the softened glass toward the chuck to shorten the length of tubulation while enlarging the diameter of the softened glass, repeating the heating and thrusting process until substantially none of the tubulation remains, thereby producing a gob of glass, delivering the gob of glass to the mold and pressing the gob against the mold and about the conductors to form a stem.

References Cited in the file of this patent

UNITED STATES PATENTS

| | | |
|---|---|---|
| 2,030,185 | Rose | Feb. 11, 1936 |
| 2,359,798 | Schumann | Oct. 10, 1944 |
| 2,442,860 | Richardson | June 8, 1948 |
| 2,552,381 | Porter | May 8, 1951 |